(12) United States Patent
Nanaumi (10) Patent No.: US 10,452,943 B2
(45) Date of Patent: Oct. 22, 2019

(54) INFORMATION PROCESSING APPARATUS, CONTROL METHOD OF INFORMATION PROCESSING APPARATUS, AND STORAGE MEDIUM

(71) Applicant: CANON KABUSHIKI KAISHA, Tokyo (JP)

(72) Inventor: Yoshihito Nanaumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 403 days.

(21) Appl. No.: 15/368,971

(22) Filed: Dec. 5, 2016

(65) Prior Publication Data

US 2017/0185859 A1 Jun. 29, 2017

(30) Foreign Application Priority Data

Dec. 28, 2015 (JP) .................. 2015-256476

(51) Int. Cl.
| | | |
|---|---|---|
| G06K 9/32 | (2006.01) | |
| G06K 9/00 | (2006.01) | |
| H04N 5/225 | (2006.01) | |
| G06K 9/20 | (2006.01) | |
| G06K 9/22 | (2006.01) | |
| G06K 9/46 | (2006.01) | |

(52) U.S. Cl.
CPC ....... *G06K 9/3233* (2013.01); *G06K 9/00026* (2013.01); *G06K 9/00456* (2013.01); *G06K 9/00469* (2013.01); *G06K 9/2054* (2013.01); *G06K 9/2081* (2013.01); *G06K 9/22* (2013.01); *H04N 5/225* (2013.01); *G06K 2009/4666* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 7,499,588 B2 | 3/2009 | Jacobs et al. | |
| 7,668,372 B2 | 2/2010 | Schiehlen | |
| 8,270,721 B2 | 9/2012 | Ogawa et al. | |
| 9,483,679 B2 | 11/2016 | Neskovic et al. | |

(Continued)

FOREIGN PATENT DOCUMENTS

| | | |
|---|---|---|
| EP | 1665132 A1 | 6/2006 |
| EP | 2092464 A1 | 8/2009 |

(Continued)

OTHER PUBLICATIONS

European Search Report dated Jun. 21, 2017 in European Application No. 16002604.3.

*Primary Examiner* — David Perlman
(74) *Attorney, Agent, or Firm* — Venable LLP (57) ABSTRACT

The information processing apparatus includes an extraction unit configured to extract a feature amount of an entire image and a feature amount of a local image, a decision unit configured to decide a position of the local image in the entire image based on the feature amount of the entire image and the feature amount of the local image, a reception unit configured to receive a selection of an object included in the local image, and a conversion unit configured to convert coordinate of the selected object in the local image into coordinate in the entire image based on the decided position of the local image in the entire image.

11 Claims, 12 Drawing Sheets

(56) References Cited

U.S. PATENT DOCUMENTS

| | | | |
|---|---|---|---|
| 2002/0003892 A1 | 1/2002 | Iwanaga | |
| 2003/0169924 A1 | 9/2003 | Nishiyama et al. | |
| 2006/0013444 A1 | 1/2006 | Kurzweil et al. | |
| 2007/0047008 A1* | 3/2007 | Graham | G06K 9/325 358/401 |
| 2007/0168382 A1 | 7/2007 | Tillberg et al. | |
| 2008/0094496 A1 | 4/2008 | Wang et al. | |
| 2010/0272360 A1 | 10/2010 | Huang | |
| 2011/0081083 A1 | 4/2011 | Lee et al. | |
| 2015/0138220 A1* | 5/2015 | Chapman | G06T 11/60 345/589 |

FOREIGN PATENT DOCUMENTS

| | | |
|---|---|---|
| EP | 2 821 934 A1 | 1/2015 |
| GB | 2507540 A | 5/2014 |
| JP | 2011-008802 A | 1/2011 |
| WO | 2005/043452 A1 | 5/2005 |

* cited by examiner

ENTIRE IMAGE — 500

PURCHASE ORDER

Order Date: July 1, 2014

Order Number:

Order company name: XYZ Co., Ltd.
Address: 1-111, ZZZ Town, YYY City, XXX Prefecture 080-1234-1234

Person in charge: Daijiro Suzuki

I will order as follows

| Model name | Product name | Quantity | Delivery date |
|---|---|---|---|
| 2801119 | Ink tank color: Cyan | 3 | July 3 |
| 3801120 | Ink tank color: Black | 3 | July 3 |
| 4801121 | Ink tank color: Magenta | 3 | Month/Date |
|  |  |  | Month/Date |
|  |  |  | Month/Date |
|  |  |  | Month/Date |

— Delivery destination —

Destination company name: ABC Co., ltd.

| Department name:<br>General affairs department | Name of person in charge:<br>Taro Yamada |
|---|---|
| Delivery address: 1-111, ZZZ Town, YYY City, XXX Prefecture | |
| Phone number: 222-22-2222 | Fax number: 111-111-1111 |

MARK — 502

LOCAL IMAGE — 501

080-1234-1234

...zuki

...der as follows

| t name | Quantity |
|---|---|
| Cyan | 3 |
| Black | 3 |
| Magenta | 3 |
|  |  |

COORDINATES MANAGEMENT TABLE — 801

| id | classification | kind | minX | maxX | minY | maxY |
|---|---|---|---|---|---|---|
| 1 | classification 1 | 1 | 4500 | 7000 | 2500 | 2800 |
| 2 | classification 1 | 1 | 1333 | 2666 | 3500 | 3900 |
| 3 | classification 1 | 1 | 1335 | 2667 | 4000 | 4400 |
| 4 | classification 1 | 2 | 7000 | 7500 | 3450 | 3880 |
| 5 | classification 1 | 2 | 7020 | 7490 | 4020 | 4390 |

PURCHASE ORDER

Order Number ______________  Order Date: July 1, 2014

Order company name: XYZ Co., Ltd.
　　Address: 1-111, ZZZ Town, YYY City, XXX Prefecture
　　　　　　080-1234-1234　　　(MARK) — 807
Person in charge: Daijiro Suzuki I will order as follows

| Model name | Product name | Quantity | Delivery date |
|---|---|---|---|
| 2801119 | Ink tank color Cyan | 3 | July 3 |
| 3801120 | Ink tank color Black | 3 | July 3 |
| 4801121 | Ink tank color Magenta | 3 | July 3 |
| | | | Month/Date |
| | | | Month/Date |
| | | | Month/Date |
| | | | Month/Date |
| | | | Month/Date |

──── Delivery destination ────
Destination company name: ABC Co., ltd.

| Department name: General affiars department | Name of person in charge: Taro Yamada |
|---|---|
| Delivery address: 1-111, ZZZ Town, YYY City, XXX Prefecture | |
| Phone number: 222-22-2222 | Fax number: 111-111-1111 |

INFORMATION PROCESSING APPARATUS, CONTROL METHOD OF INFORMATION PROCESSING APPARATUS, AND STORAGE MEDIUM

BACKGROUND OF THE INVENTION

Field of the Invention

The present invention relates to an information processing apparatus, a control method of the information processing apparatus, and a storage medium.

Description of the Related Art

In recent years, a mobile terminal having a camera has become common. A user has used a scanner and the like to electronically capture a paper document in the related art, but it is now possible to electronically capture a paper document simply by using the camera and the like of the mobile terminal. Japanese Patent Laid-Open No. 2011-008802 discloses a technology for performing OCR on images captured by using the camera.

SUMMARY OF THE INVENTION

In order to use text information identified by the OCR, OCR accuracy is very important. However, there is a possibility that the OCR accuracy may be lowered in the paper document of a relatively large size such as A4 or A3 compared with the OCR accuracy in a business card or a driver's license captured in close proximity to an object. More specifically, in addition to the lowering of resolution of each single character in text to be identified caused by being distanced from an object, blurring is likely to occur in focusing of image details. Therefore, it is essential to capture images in close proximity to a text region of an object even in a paper document of a relatively large size such as A4 or A3 to improve OCR accuracy. With improved OCR accuracy, it is possible to acquire an entire image of a paper document and text information with good accuracy by capturing images in close proximity to a text region to be used after the entire image of the paper document are captured.

The present invention provides an information processing apparatus which can find a required text region at high speed if an image is captured in close proximity to a paper document.

An information processing apparatus of the present invention is provided that includes an extraction unit configured to extract a feature amount of an entire image and a feature amount of a local image; a decision unit configured to decide a position of the local image in the entire image based on the feature amount of the entire image and the feature amount of the local image; a reception unit configured to receive a selection of an object included in the local image; and a conversion unit configured to convert coordinate of the selected object in the local image into coordinate in the entire image based on the decided position of the local image in the entire image.

According to the present invention, an information processing apparatus can be provided that can find a required text region if an image is captured by an access to a paper document.

Further features of the present invention will become apparent from the following description of exemplary embodiments (with reference to the attached drawings).

DESCRIPTION OF THE EMBODIMENTS

Hereinafter, a best embodiment for executing the present invention will be described with reference to drawings and the like.

[Appearance]

Figure 1:
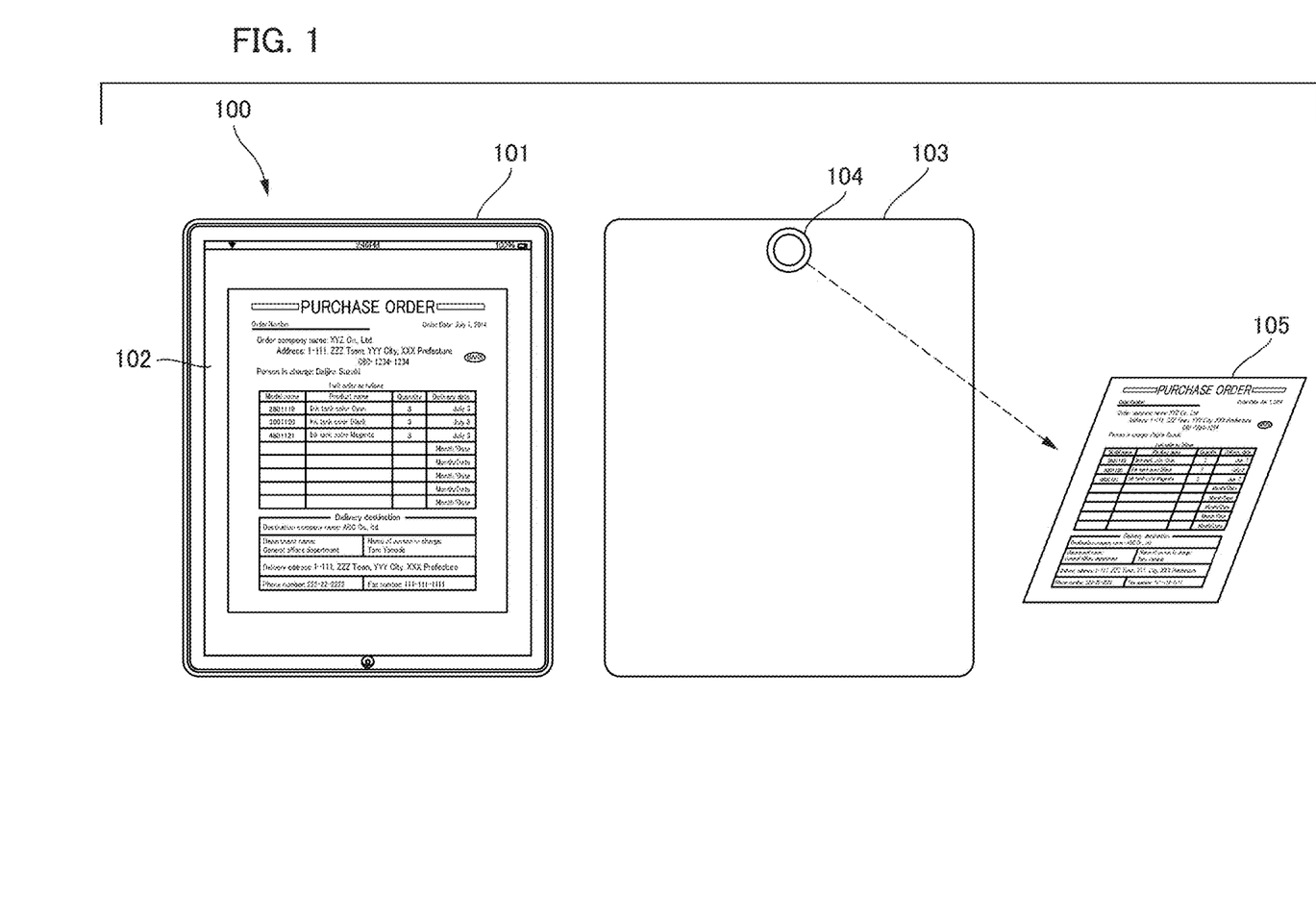
FIG. 1 is a diagram illustrating an example of an appearance of a mobile terminal.

First, a mobile terminal will be described as an example of an information processing apparatus according to the present embodiment. The mobile terminal is an example of a mobile terminal and is a terminal which can be used in anyplace using equipment having a wireless communication function. FIG. 1 is a diagram illustrating an example of an appearance of the mobile terminal. A mobile terminal 100 is configured to include units of various types (mobile terminal front surface unit 101 to camera 104). A front side of the mobile terminal 100 is the mobile terminal front surface unit 101. A touch panel 102 is an example of a display unit such as a display, and has two functions of output (display) and input. In addition, a back side of the mobile terminal 100 is a mobile terminal rear surface unit 103. The mobile terminal rear surface unit 103 includes a camera 104 for capturing an image. In the present embodiment, a user of the mobile terminal 100 can start processing by taking an image of a object 105 in a mobile application to be described below. In the present embodiment, the object 105 is an purchase order as a paper document in A4size. The object 105 is not limited only to the paper document, and may include, for example, business cards, photos, white boards, and the like. Moreover, the mobile application to be described below make it possible to capture the image of the object 105 and to output (display) the image to a touch panel 102.

[Hardware Configuration]

Figure 2:
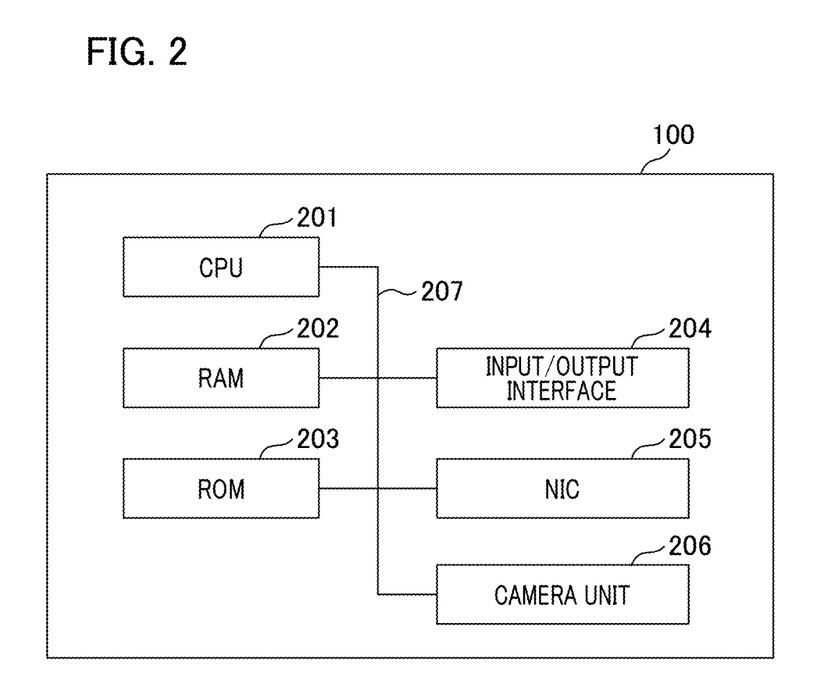
FIG. 2 is a diagram illustrating an example of a hardware configuration of the mobile terminal.

FIG. 2 is a diagram illustrating an example of a hardware configuration of the mobile terminal 100. The mobile terminal 100 is configured to include various types of units (CPU 201 to bus 207). The central processing unit (CPU) 201 is a unit for executing programs of various types and realizing various functions. A random access memory (RAM) 202 is a unit for storing programs of various types information. In addition, the RAM 202 is a unit which is also used as a temporary work storage region of the CPU 201. A read only memory (ROM) 203 is a unit for storing various types of programs and the like. For example, the CPU 201 loads a program stored in the ROM 203 onto the RAM 202 and executes the program.

Figure 3:
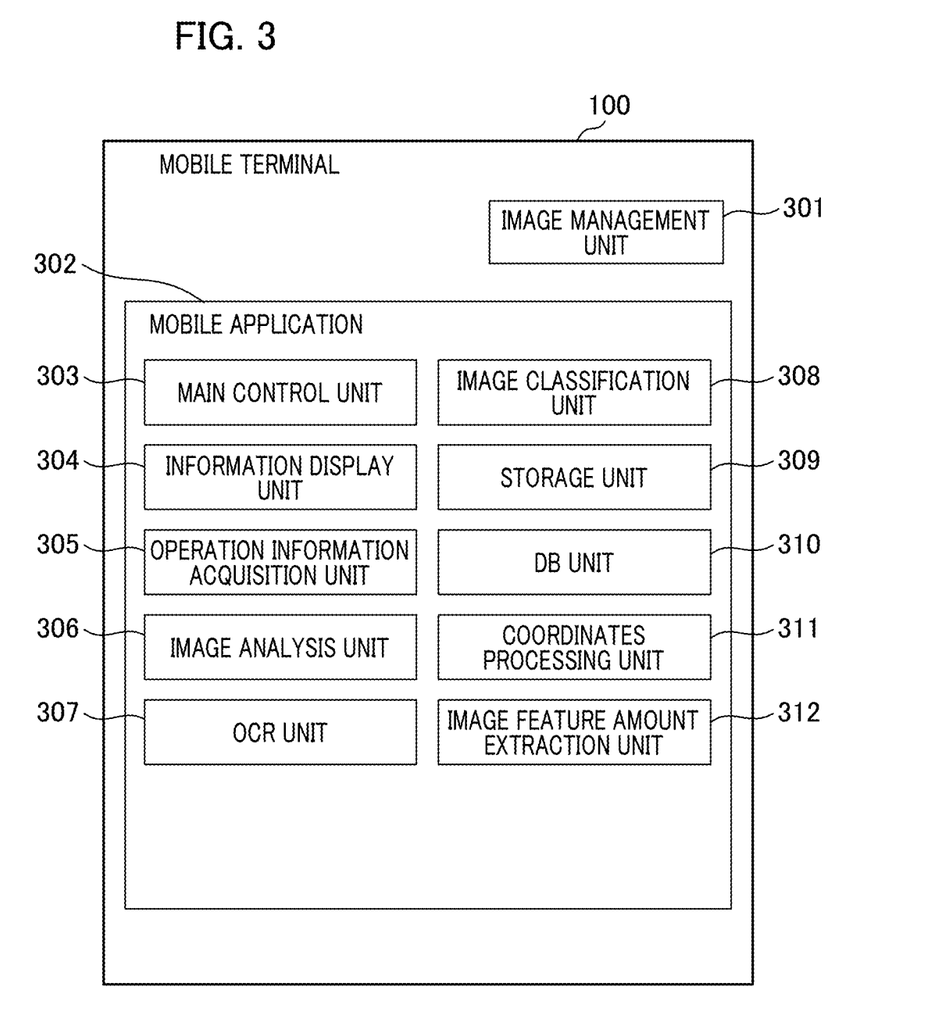
FIG. 3 is a diagram illustrating an example of a software configuration of the mobile terminal.

In addition, the CPU 201 executes processing based on a program stored in an external storage device such as a flash memory, a hard disk drive (HDD), or a solid state disk (SSD). Accordingly, a software configuration which configures the mobile terminal 100 as shown in FIG. 3 to be described below and processing in each step of a sequence to be described below are realized. All or some of the processing related to the sequence to be described below and functions of the mobile terminal 100 may be also realized using dedicated hardware. An input/output interface 204 transmits or receives data to or from the touch panel 102. A network interface card (NIC) 205 is a unit for connecting the mobile terminal 100 to a network (not shown). A camera unit 206 is connected to the camera 104 and captures an image of the object 105 in the mobile terminal 100. Each of the units described above is configured to be capable of transmitting and receiving data through the bus 207.

[Software Configuration (Mobile Terminal)]

Next, a configuration of software in the mobile terminal 100 will be described. FIG. 3 is a diagram illustrating an example of the software configuration of the mobile terminal 100. A program for realizing a function (module unit) in each piece of software (application) shown in FIG. 3 is stored in the ROM 203 and the like of each device. An operating system (OS) (not shown) of the mobile terminal 100 has a data management unit 301. The data management unit 301 manages images or application data. The OS provides a control application programming interface (API) for using the data management unit 301. Each application acquires or saves the images or the application data managed by the data management unit 301 by using the control API.

A mobile application 302 is an application which can be executed by performing a download and an installation using an installation function (for example, Apple Store, Google Play, and the like) of the OS of the mobile terminal 100. The mobile application 302 performs various types of data processing on the image of the object 105 captured through the camera unit 206.

A main control unit 303 controls an application (mobile application) 302 and performs an instruction and management for each of module units (a main control unit 303 to an image feature amount extraction unit 312). An information display unit 304 provides the user with a user interface (UI) of the mobile application 302 according to an instruction from the main control unit 303. An operation information acquisition unit 305 acquires information on an operation of the user of the UI of the mobile application 302 displayed by the information display unit 304, and notifies the main control unit 303 of the acquired information. For example, if the user touches a display and operation region 401 shown in FIG. 4 to be described below with a hand, the operation information acquisition unit 305 detects information on a touched position on a screen and transmits the detected information on the position to the main control unit 303.

An image analysis unit 306 analyzes a camera input image acquired through the camera unit 206 and generates layout information. The layout information includes a rectangular region extracted from an image and a type (characters, graphics, lines, tables, and the like) of the rectangular region. In addition, the image analysis unit 306 performs paper detection processing and distortion correction processing on the camera input image. An OCR unit 307 performs optical character recognition (OCR) processing on the rectangular region extracted by the image analysis unit 306. An image classification unit 308 performs learning processing to create a classifier used in classification processing. Moreover, the image classification unit 308 performs the classification processing using the classifier and performs classification on the camera input image.

A storage unit 309 saves (causes a set value to persist) the set value input by the user through the operation information acquisition unit 305, that is, through the UI of the mobile application 302. A DB unit 310 has a data base function and manages coordinate information of the rectangular region, selected by the user, a feature amount of an image, the classifier, and the like. In addition, data of the DB unit 310 is saved in the storage unit 309. A coordinate processing unit 311 performs coordinate conversion processing at a time of registering coordinate information in the data base or position specification processing of an image. The image feature amount extraction unit 312 performs processing to extract a feature amount of an image on the camera input image.

Figure 4:
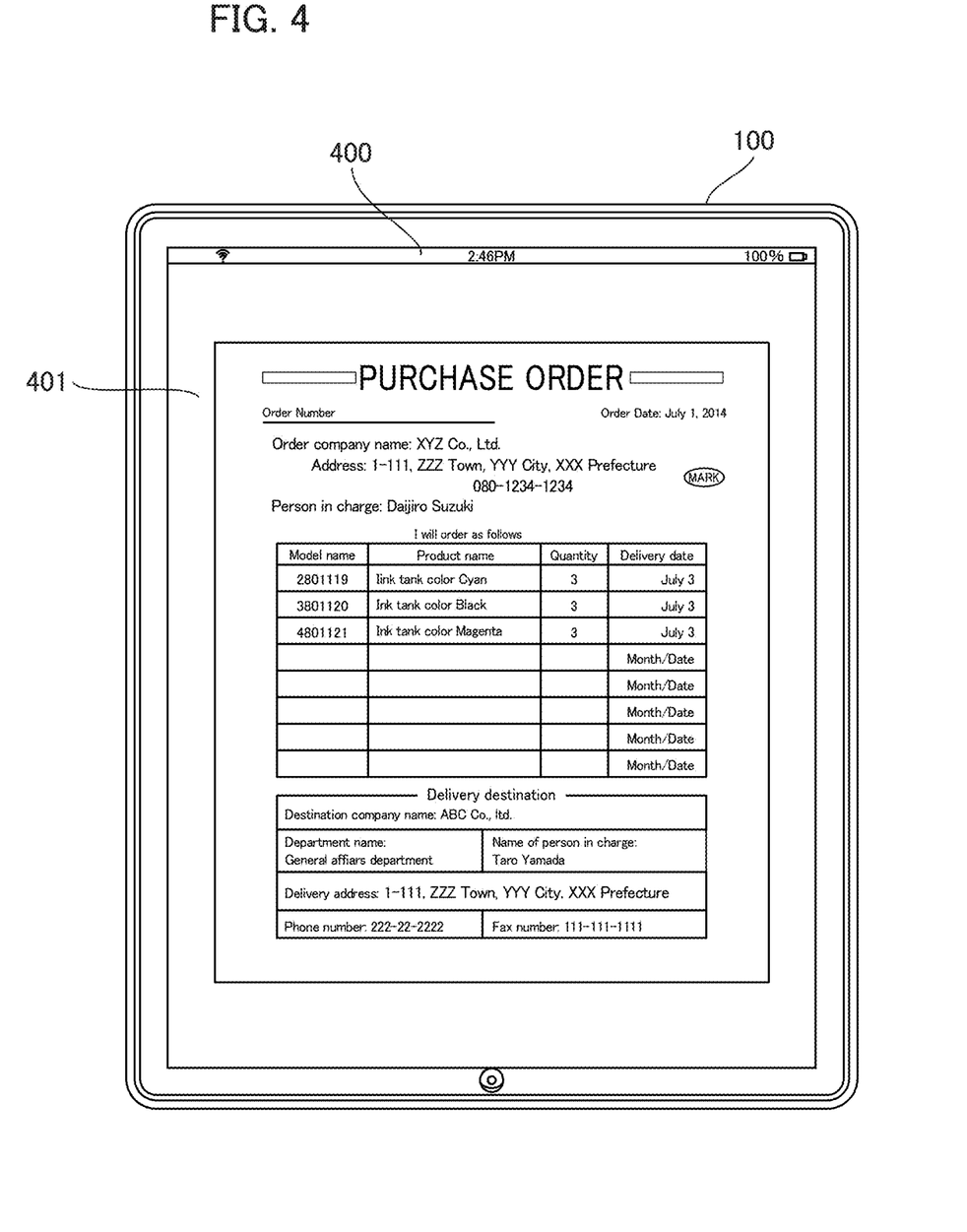
FIG. 4 is a diagram illustrating an example of a UI of a mobile application.

FIG. 4 is a diagram illustrating an example (a mobile terminal screen 400) of a screen for providing the UI (UI for a mobile terminal) of the mobile application 302. The mobile terminal screen 400 is a UI displayed on the touch panel 102 of the mobile terminal 100. An image captured through the camera 104 is displayed in the display and operation region 401 on the mobile terminal screen 400, and an operation (user operation) of a user for an image and the like is received through the displayed UI. Forms (position, size, range, arrangement, display content, and the like) of the UI of the mobile application 302 are not limited to the present embodiment shown in FIG. 4, and it is possible to adopt the configuration in which functions of the mobile terminal 100 can be realized.

[Entire Image and Local Image]

Figure 5:
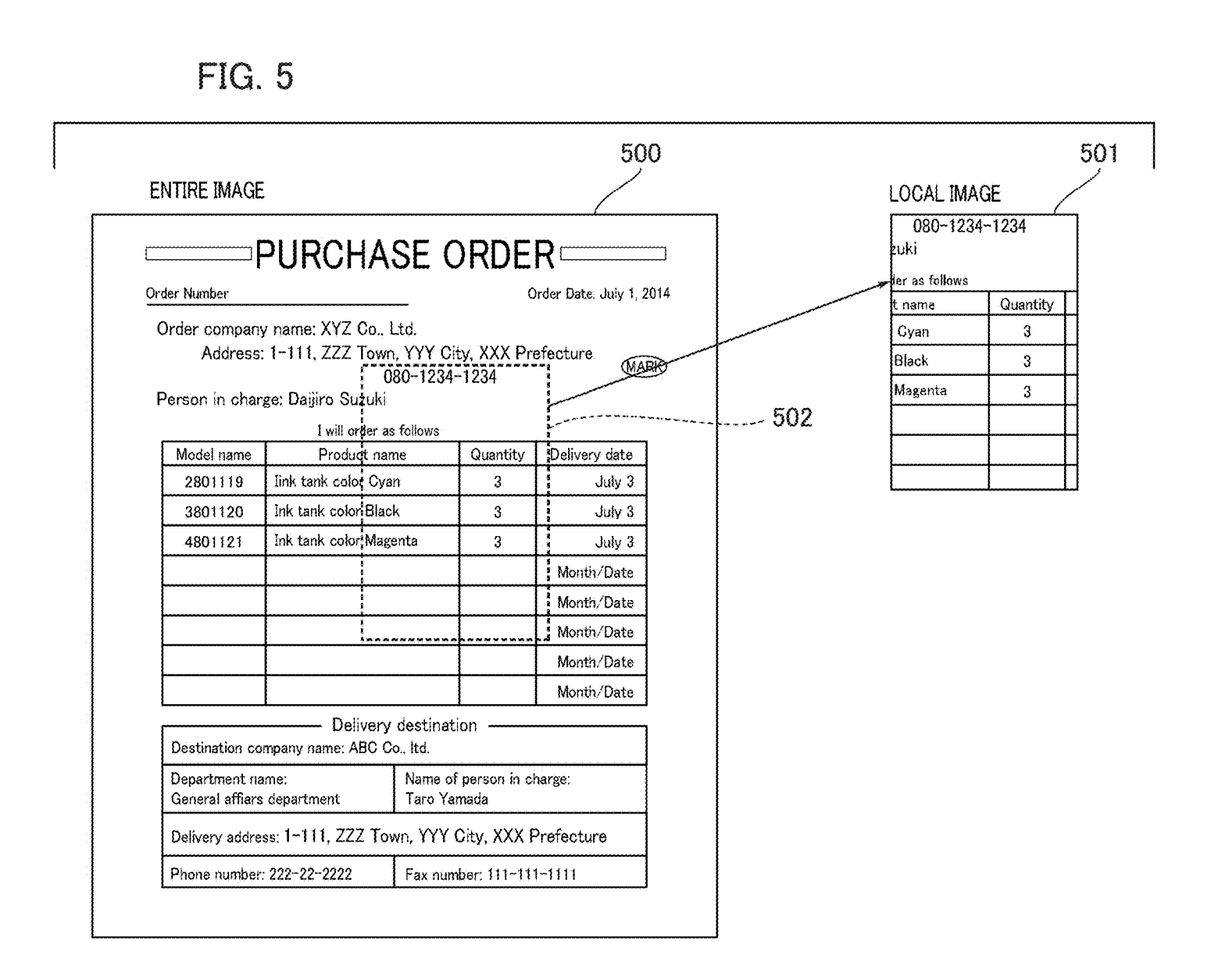
FIG. 5 is a diagram illustrating an example of an entire image and a local image.

Next, an entire image and a local image will be described using FIG. 5. In the present embodiment, an image of an entire purchase order in A4 size of the object 105 is acquired through the camera 104. The image is shaped by performing the paper detection processing to exclude regions other than the subject and the distortion correction processing to correct a distorted portion. In the present embodiment, the shaped image is set as an entire image 500 and regarded as the example of the entire image. In addition, the image of the portion (or the entirety) of the object 105 acquired by the camera 104 in close proximity to the object 105 is set as a local image 501. In the present embodiment, the local image 501 is the example of the local image. Furthermore, a position 502 shows the region (position) of the local image in the entire image.

[Image Classification Processing]

Next, classification of the camera input image performed by the image classification unit 308 will be described using FIGS. 6A and 6B. The image classification unit 308 is configured from a learning processing unit 601 and a classification processing unit 602. The learning processing unit 601 performs the learning processing to be described below using entire image feature amount data 608 of an image in each document type (each type) to classify, and creates a classifier. The image classification unit 308 performs the classification processing using the created classifier, and decides classification of the camera input image.

In general, feature amount data representing the feature of an image is indicated by multi-dimensional data, and is referred to as a feature vector. The number of dimensions shows what type a type of the feature is. In the learning processing performed by the learning processing unit 601, the image feature amount extraction unit 312 performs feature extraction from a plurality of learning images (entire image) of each document type to classify, and a 100-dimensional feature vector with respect to each of the learning images is calculated. Furthermore, a 10-dimensional feature vector with an outstanding feature in the classification is decided from the 100-dimensional feature vector based on feature vectors of the plurality of learning images of the same document. This dimension reduction processing is performed by a software component referred to as a filter. A set of combinations of a filter and the feature vector (10 dimensions) calculated in each document is referred to as a classifier 607, and is managed along with the entire image feature amount data 608 for each document type by the DB unit 310.

In the learning processing performed by the classification processing unit 602, the image feature amount extraction unit 312 performs feature extraction on a local image acquired through the camera 104, and the feature vector (100 dimensions) is calculated. Next, a filter of each classification of the classifier 607 is applied (principal component analysis) to the calculated feature vector (100 dimensions) and thereby the feature vector (10 dimensions) corresponding to each classification is calculated. Then, the feature vector (10 dimensions) of the local image is compared with the feature vector (10 dimensions) of each document of a classifier, and classification is decided by a similarity determination. In the similarity determination, if similarity does not exceed a threshold value, it is decided to be a classification failure.

Figure 6A:
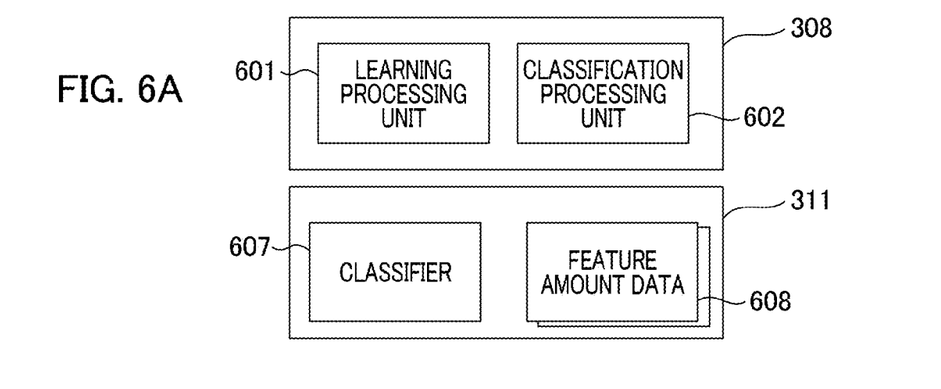
FIGS. 6A and 6B are diagrams illustrating examples of image classification processing.
Figure 6B:
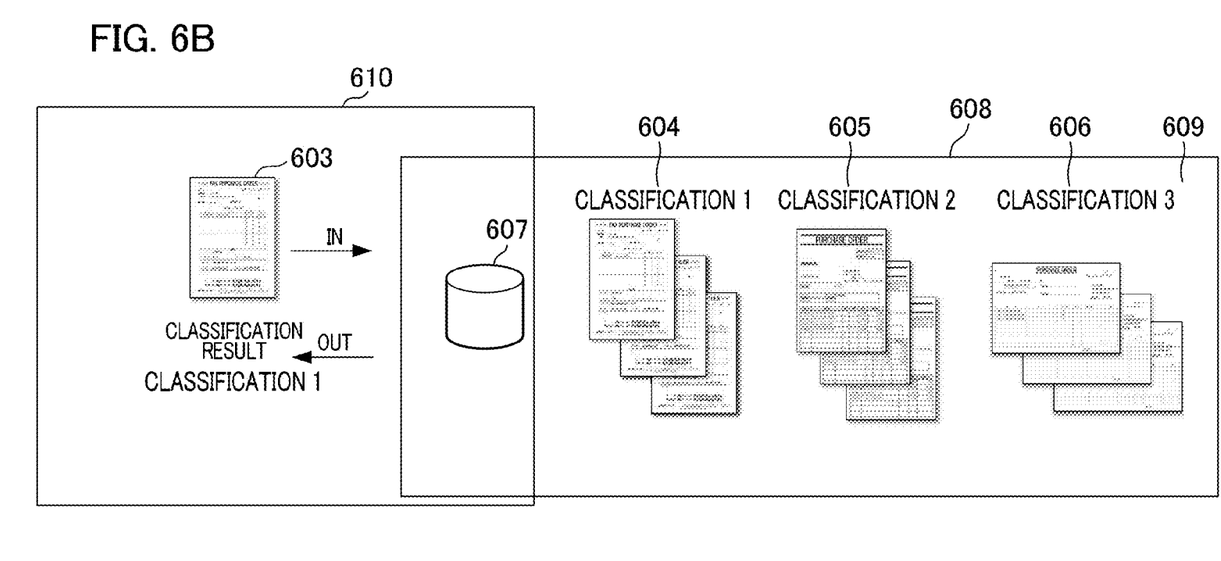

A learning result 609 of FIGS. 6A and 6B shows an example of data stored in the DB unit 310 by the learning processing of the learning processing unit 601. The DB unit 310 includes entire image feature amount data 608 extracted from an entire image for each document type and the classifier 607 which can classify a classification 1 (604), a classification (605), and a classification 3 (606). In addition, a classification result 610 represents an example in which classification is decided based on information of the classifier 607 and the local image by the classification processing of the classification processing unit 602. In the present embodiment, the classification result 610 shows that a local image is input and a classification result is determined to be the classification 1 (604) among the classification 1 (604), the classification 2 (605), and the classification 3 (606). Image classification performed by the image classification unit 308 is not limited to the present embodiment, and it is possible to adopt an appropriate technique capable of realizing the function.

[Coordinate Processing]

Figure 7:
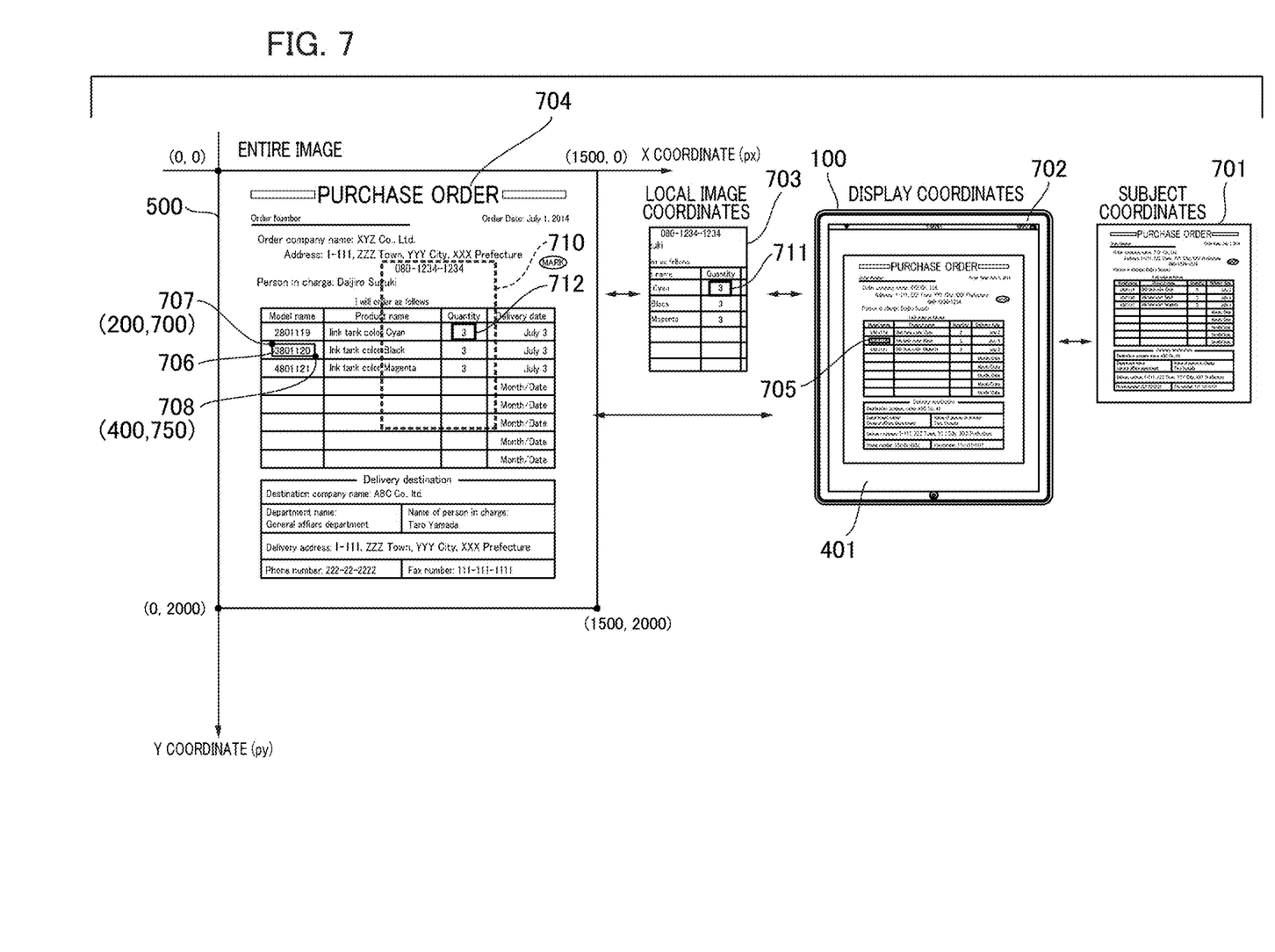
FIG. 7 is a diagram illustrating an example of coordinate processing.

Next, the coordinate system according to the present embodiment, the coordinate conversion processing performed by coordinate processing unit 311 and rectangular region coordinate managed by the DB unit 310 will be described using FIG. 7. First, a coordinate system according to the present embodiment includes subject coordinate 701, display coordinate 702, local image coordinate 703, entire image coordinate 704, and DB registration coordinate. The subject coordinate 701 are the set of coordinate which indicate the position in an A4 purchase order, the display coordinate 702 are the set of positional coordinate in the display, the local image coordinate 703 are the set of positional coordinate in the local image, and the entire image coordinate 704 are the set of positional coordinate in the entire image. The DB registration coordinate are the set of normalized (multiply a ratio of the entire image coordinate to the entirety by 10000) entire image coordinate. A reason for normalization is that, even if there is no dependency on length and width of an original image and having a different DPI (even if photographing is performed nearby or photographing is performed at a distance), it is possible for there to be correspondence.

Here, the coordinate conversion processing is processing to convert between these coordinate systems. For example, in rectangular region coordinate saving processing (step S904 to be described below), a rectangular region (display coordinate) 705 selected on the display by the user is converted into the entire image coordinate 706 and, moreover, is converted into the DB registration coordinate and saved in the DB unit 310. The rectangular region coordinate managed by the DB unit 310 has an upper left X coordinate of the rectangular region set as minX, a lower right X coordinate set as maxX, an upper left Y coordinate set as minY, and a lower right Y coordinate set as maxY. Description is provided with a case in which a width of the entire image 500 is 1500 px and a length thereof is 2000 px. If upper left coordinate 707 of the entire image coordinate 706 are (X,Y)=(200,700) and lower right coordinate 708 are (400,750), the DB registration coordinate are (1333,3500), (2666,3750).

[Data Structure (DB)]

Figure 8:
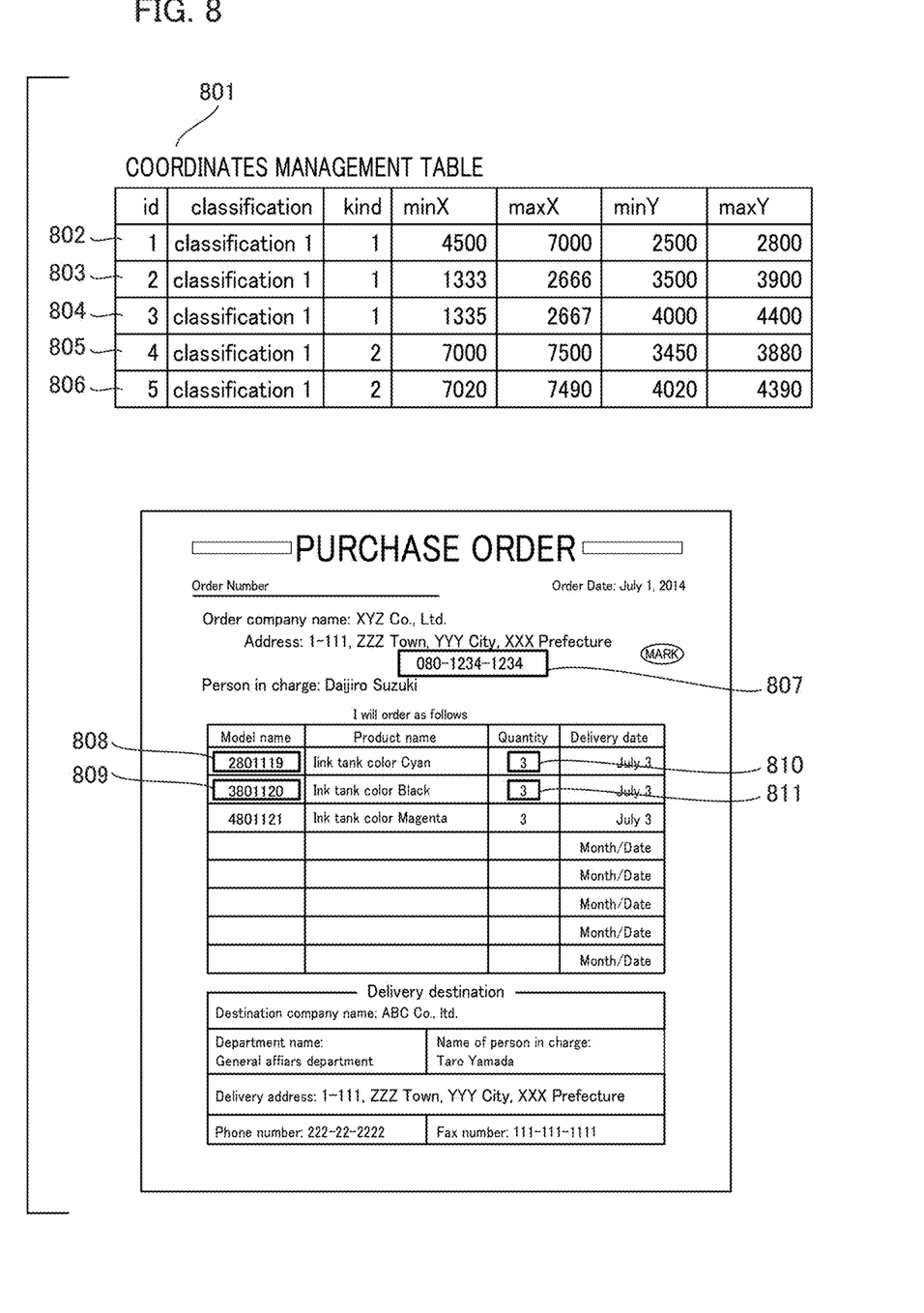
FIG. 8 is a diagram illustrating a data structure and held coordinate information of a coordinate management table.

Next, a coordinate management table of the DB unit 310 will be described. FIG. 8 is a diagram illustrating a data structure of the coordinate management table according to the present embodiment and an example of coordinate information which is held. A coordinate management table 801 is configured from an id column, a classification column, a kind column, a minX column, a maxX column, a minY column, and a maxY column. The id column is the value incremented by one in time that the record is added to the coordinate management table 801 and is a primary key of the table. The classification column stores the classification result (for example, the classification result 610 of FIGS. 6A and 6B). The kind column stores an identifier to identify whether or not data is data saved by rectangular region coordinate saving processing (step S904 to be described below) or data saved by rectangular region coordinate saving processing by the user's selection. The minX column stores an upper left X coordinate of a selected region. The maxX column stores the lower right X coordinate of the selected region. The minY column stores an upper left Y coordinate of the selected region. The maxY column stores the lower right Y coordinate of the selected region. In the drawing, coordinate information corresponding to selected regions 807, 808, and 809 which are regions selected in the rectangular region coordinate saving processing (step S904 to be described below) by a user is coordinate information 802, coordinate information 803, and coordinate information 804. Coordinate information corresponding to selected regions 810 and 811 which are regions selected in the rectangular region coordinate saving processing by a user's selection is coordinate information 805 and coordinate information 806.

[Pre-Setting Processing Flow]

Figure 9:
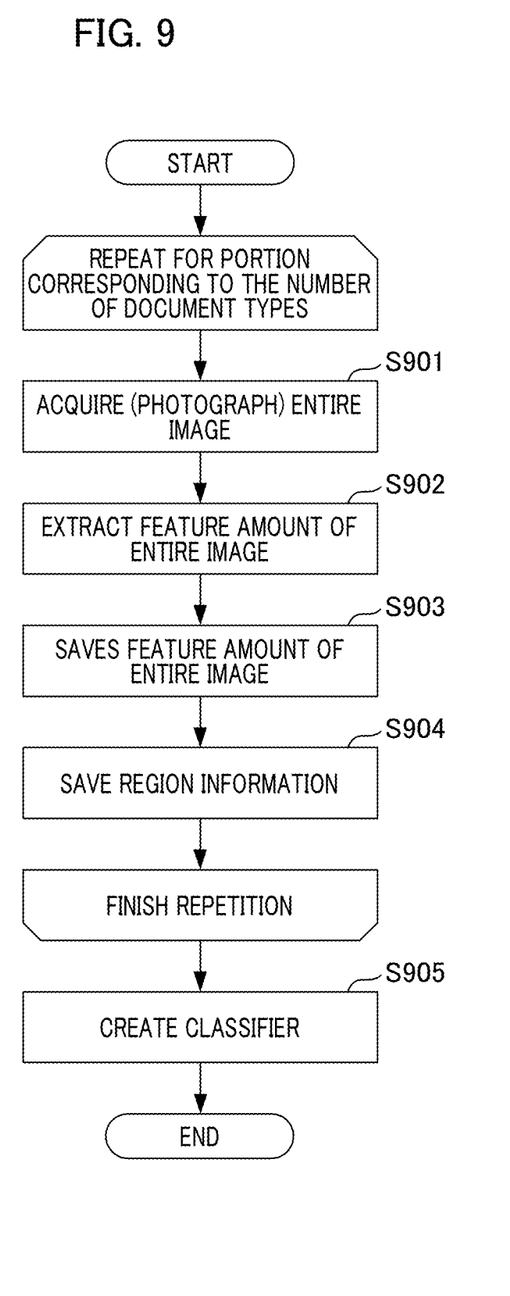
FIG. 9 is a diagram illustrating a pre-setting processing flow.

Next, a pre-setting processing flow in the mobile terminal will be described using FIG. 9. The flow starts from a step of acquiring an image of the object 105 through the camera 104 in the mobile terminal 100 using the mobile application 302 by a user as a trigger. Processing of following steps S901 to S904 are repeated for the portion of the number of document types (the portion of three document types for classification into classification 1 to classification 3 in the present embodiment).

First, the image analysis unit 306 of the mobile application 302 performs the paper detection processing and the distortion correction processing on the camera input image and acquires the entire image 500. Next, the image feature amount extraction unit 312 extracts the entire image feature amount data 608 from the entire image 500 in step S902.

Then, the main control unit 303 of the mobile application 302 saves the entire image feature amount data 608 in the DB unit 310 in correlation with a document type in step S903. Then, the main control unit 303 of the mobile application 302 displays the entire image 500 acquired in step S901 in the display and operation region 401 of the mobile terminal 100, and allows a user to select rectangular region coordinate (for example, the rectangular region 705) in step S904. Furthermore, the main control unit 303 performs the coordinate conversion processing using the coordinate processing unit 311, converts the rectangular region coordinate 705 into the entire image coordinate 706, and converts the result into DB registration coordinate. Then, the main control unit 303 saves the coordinate information 804 in the DB unit 310. The coordinate information 802 and 803 are also saved in the same procedure.

After repetition of the processing for the portion of the number of document types is finished, the learning processing unit 601 of the image classification unit 308 creates the classifier 607 based on the entire image feature amount data 608 for the document type portion and saves the classifier in the DB unit 310 in step S905. According to the above processing, the entire image feature amount data 608 for each document, coordinate information (802, 803, and 804), and the classifier 607 to be used in processing to be described below are created.

[Basic Flow]

Next, a basic processing flow in the mobile terminal 100 will be described using FIG. 10. The flow starts from a step of acquiring an image by an access of the camera 104 to the object 105 using the mobile application 302 in the mobile terminal 100 by a user as the trigger.

First, the mobile application 302 acquires the local image 501 through the camera unit 206 in step S1001. Next, the image feature amount extraction unit 312 extracts the local image feature amount from the local image in step S1002. Then, the image classification unit 308 performs the classification processing in the classification processing unit 602 using the extracted local image feature amount and the classifier 607, and decides classification of the local image in step S1003. Then, the mobile application 302 determines whether or not the local image is classified in step S1004. If the local image can be classified (Yes), the procedure transits to step S1005. On the other hand, if the local image cannot be classified (No), the procedure returns to step S1001 to acquire the local image through the camera unit 206 again.

Next, the main control unit 303 of the mobile application 302 displays the local image in the display and operation region 401 in step S1005. Furthermore, the main control unit decides the position 502 of the local image 501 in the entire image 500 using the coordinate processing unit 311 and displays the text region. Step S1005 will be described below in detail using FIG. 12. Next, the mobile application 302 determines whether or not there is the selection of the text region by a user in step S1006. If there is the selection of the text region by a user (Yes), the procedure transits to step S1007. On the other hand, if there is no selection of the text region by the user (No), the procedure returns to step S1005 to perform text region display processing again.

Next, the mobile application 302 acquires text information on the text region selected by a user in step S1007. Then, the mobile application 302 converts rectangular coordinate 711 of the text region selected by a user in the coordinate processing unit 311 into rectangular coordinate 712 of an entire image from the position 502 of the entire image and the local image defined in step S1005. Then, the mobile application 302 saves the rectangular coordinate 712 in the coordinate management table 801 of the DB unit 310 (coordinate information 805 and 806).

[Text Region Display Processing Flow]

Figure 10:
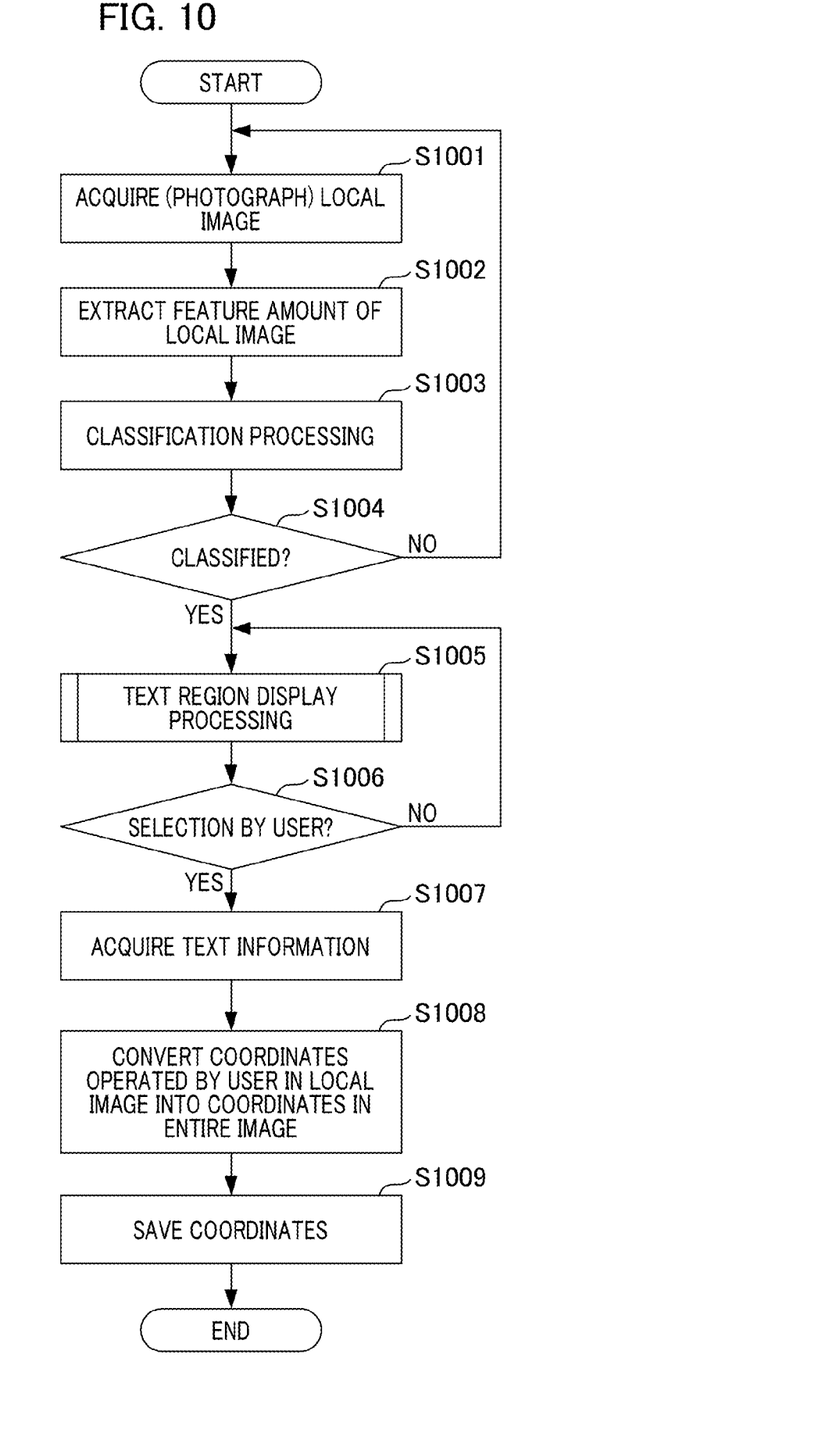
FIG. 10 is a diagram illustrating a basic flow.
Figure 11:
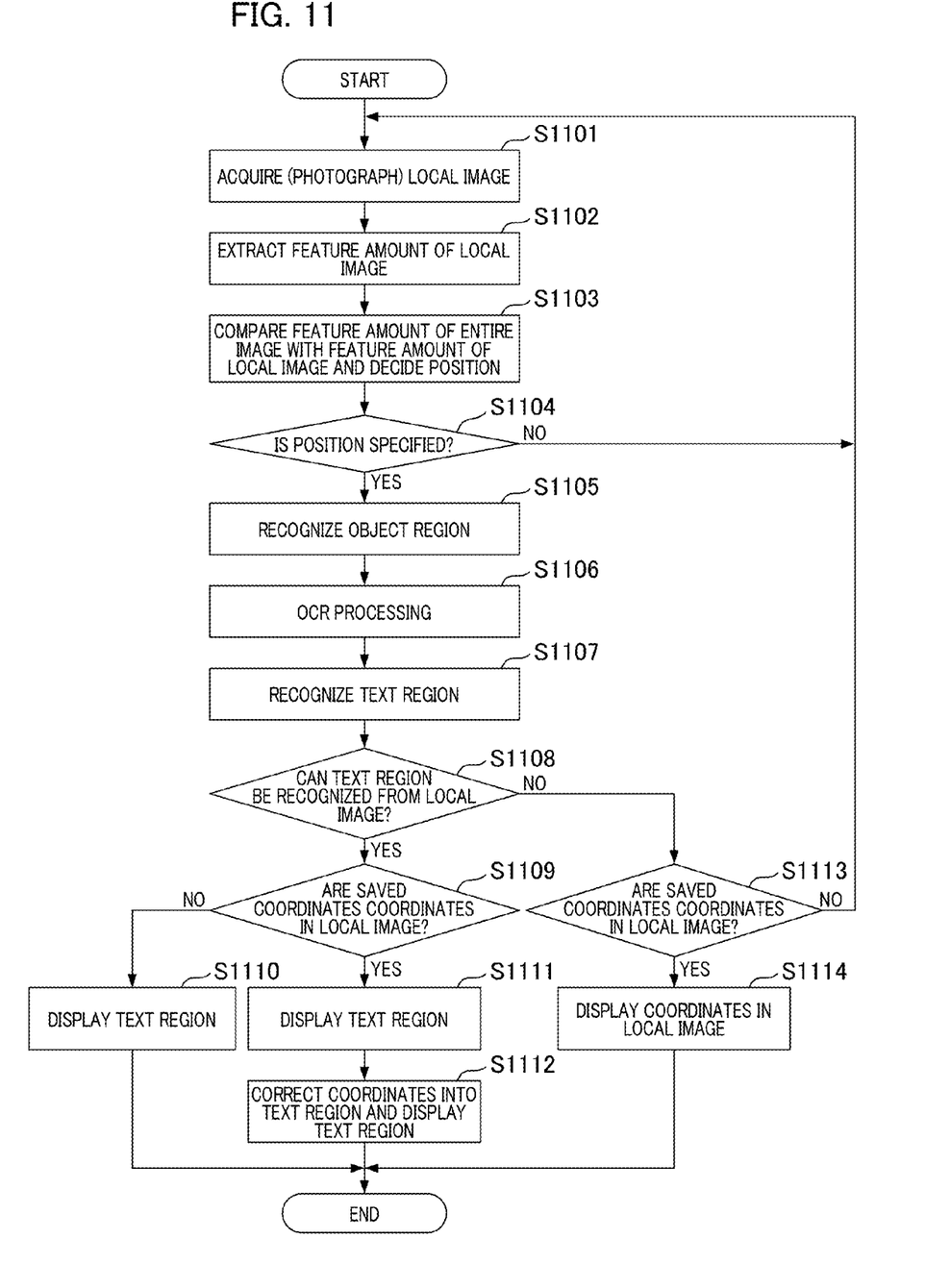
FIG. 11 is a diagram illustrating details of processing in step S1005 of FIG. 10.

FIG. 11 is a flowchart illustrating details of the processing of step S1005 in the flow of FIG. 10. First, the mobile application 302 acquires the local image to be processed through the camera unit 206 in step S1101. Next, the image feature amount extraction unit 312 extracts the local image feature amount from the local image 501 in step S1102. Then, the coordinate processing unit 311 acquires the entire image feature amount data 608 of the classification (classification 1) decided in step S1003 from the DB unit 310 in step S1103. Then, the entire image feature amount data 608 is compared with the local image feature amount, and thereby the position 502 of the local image in the entire image is specified.

Figure 12:
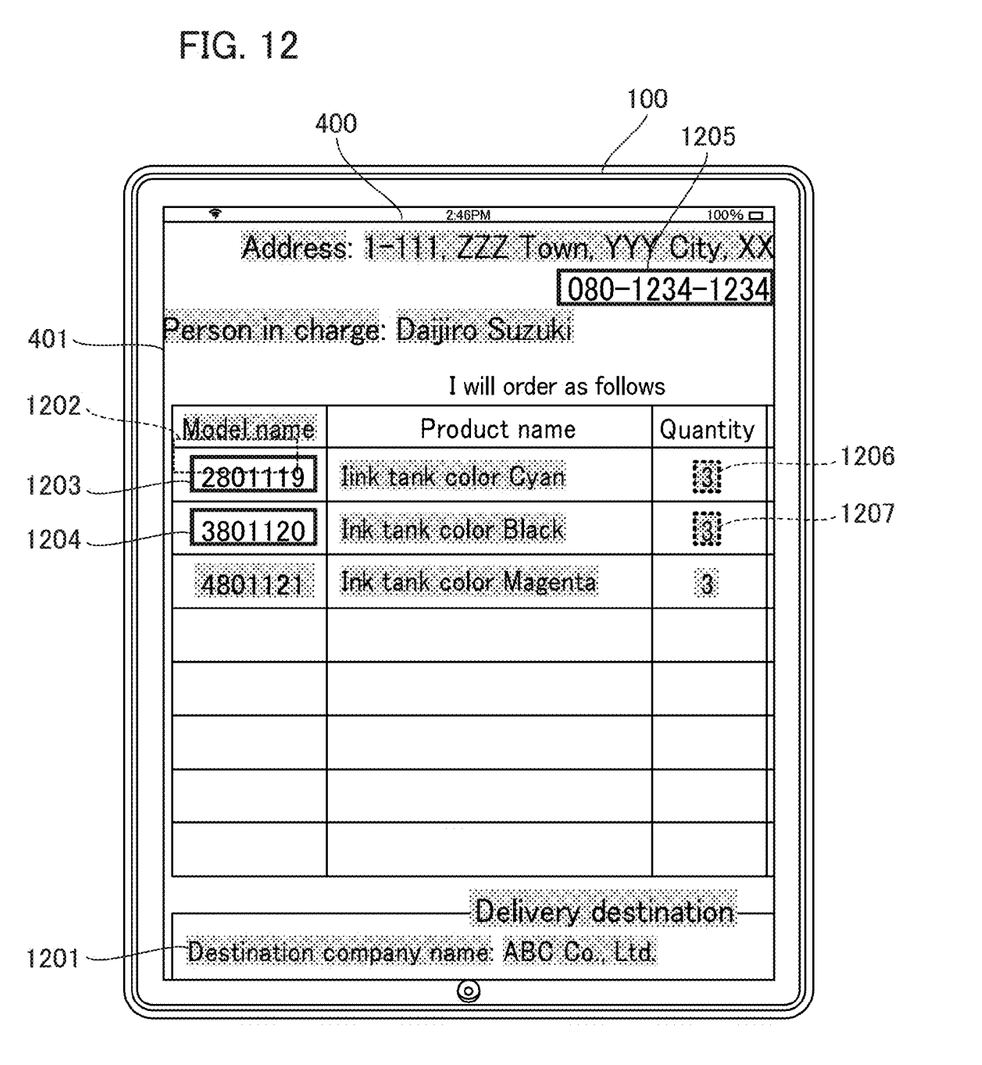
FIG. 12 is a diagram illustrating an example of the UI of the mobile application.

Next, it is determined whether or not the position is specified in step S1104. If the position can be specified (Yes), the procedure transits to step S1105, and on the other hand, if the position cannot be specified (No), the procedure returns to step S1101. Next, the OCR unit 307 recognizes an object region in the local image 501 in step S1105. Next, the OCR unit 307 performs OCR processing on the object region recognized in step S1105, and recognizes text information in step S1106. Then, the OCR unit 307 recognizes the object region in which text information can be recognized as the text region. A text region 1201 of FIG. 12 is the example of the recognized text region. Then, the main control unit 303 determines whether or not the text region is recognized in the local image in step S1108. If the text region can be recognized (Yes), the procedure transits to step S1109. On the other hand, if the text region cannot be recognized (No), the procedure transits to step S1113.

Next, the coordinate processing unit 311 converts coordinate information (802 to 806) saved in the DB unit 310 from entire image coordinate into local image coordinate by the coordinate conversion processing, and determines whether or not the converted local image coordinate are coordinate in the local image 501 in step S1109. If the coordinate are in the local image 501 (Yes), the procedure transits to step S1111. On the other hand, if the coordinate are not in the local image (No), the procedure transits to step S1110. Then, the information display unit 304 overlaps the text region recognized in step S1107 onto the local image and displays the text region in the display and operation region 401 in step S1110, and the processing ends.

Next, the information display unit 304 overlaps the text region recognized in step S1107 onto the local image and displays the text region in the display and operation region 401 in step S1111. Then, the coordinate processing unit 311 corrects the converted local image coordinate into the text region and displays the text region in step S1112. In other words, if the converted local image coordinate overlap the text region even a little, the converted local image coordinate are corrected and the text region is displayed. Furthermore, if the converted local image coordinate overlap a plurality of text regions, the converted local image coordinate are corrected to coordinate for which there is more area of the overlap and the text region is displayed.

Here, the text region after correction in the display example will be described with reference to FIG. 12. Coordinate 1202 are local image coordinate before correction, and a display example 1203 is a display example after correction. In addition, display examples 1205, 1203, and 1204 correspond to the coordinate information 802, 803, and 804 in FIG. 8. Moreover, display examples 1206 and 1207 correspond to the coordinate information 805 and 806 shown in FIG. 8.

Returning back to FIG. 11, the coordinate processing unit 311 converts the coordinate information (802 to 806) saved in the DB unit 310 from entire image coordinate to local image coordinate by performing the coordinate conversion processing, and determines whether or not the converted local image coordinate are coordinate in the local image 501 in step S1113. If the coordinate are in the local image 501 (Yes), the procedure transits to step S1114. On the other hand, if the coordinate are not in the local image 501 (No), the procedure returns to step S1101. Next, the information display unit 304 displays the coordinate converted from the entire image coordinate into the local image coordinate in the local image. Then, the processing ends.

As described the above, according to the present embodiment, if an image is captured by an access to the paper document, it is possible to find the required text region at high speed by displaying the region saved in advance as the selection candidate of the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-256476, filed Dec. 28, 2015 which is hereby incorporated by reference wherein in its entirety.

What is claimed is:

1. An information processing apparatus comprising:
   a storage that stores a first feature amount of an entire image and coordinates information of an area included in the entire image; and
   a processor that perform:
   extracting a second feature amount of a local image;
   deciding a position of the local image in the entire image based on the stored first feature amount of the entire image and the extracted second feature amount of the local image;
   recognizing positions of text regions from the local image; and
   displaying the local image and an area corresponding to the stored coordinates information stored in the storage, wherein the displayed area overlaps with the displayed local image, and wherein a position of the displayed area corresponding to the stored coordinates information is corrected based on the recognized positions of the text regions.

2. The information processing apparatus according to claim 1, wherein, if the position of the area corresponding to the stored coordinate information overlaps with the recognized positions of the text regions, the processor corrects the position of the area corresponding to the stored coordinate information based on a position of a text region for which there is more area of the overlap.

3. The information processing apparatus according to claim 1, wherein the position of the text region is recognized by OCR processing in the local image.

4. The information processing apparatus according to claim 1, wherein the processor performs in advance:
   extracting the first feature amount of the entire image;
   obtaining the coordinates information of the area included in the entire image; and
   controlling the storage to store the extracted first feature amount of the entire image and the obtained coordinates information of the area included in the entire image.

5. The information processing apparatus according to claim 1, wherein the processor further performs:
   receiving a user's selection of the displayed area; and
   obtaining text information of an area selected based on the user's selection.

6. An information processing method comprising:
   storing a first feature amount of an entire image and coordinates information of an area included in the entire image;
   extracting a second feature amount of a local image;
   deciding a position of the local image in the entire image based on the first feature amount of the entire image and the extracted second feature amount of the local image;
   recognizing positions of text regions from the local image; and
   displaying the local image and an area corresponding to the stored coordinates information, wherein the displayed area overlaps with the displayed local image, and wherein a position of the displayed area corresponding to the stored coordinates information is corrected based on the recognized positions of the text regions.

7. The information processing method according to claim 6, wherein, if the position of the area corresponding to the stored coordinate information overlaps with the recognized positions of the text regions, the position of the area corresponding to the stored coordinate information is corrected based on a position of a text region for which there is more area of the overlap.

8. The control method according to claim 6, wherein the position of the text region is recognized by OCR processing.

9. The information processing method according to claim 6, further comprising:
   extracting the first feature amount of the entire image;

obtaining the coordinates information of the area included in the entire image; and wherein the extracted first feature amount of the entire image and the obtained coordinates information of the area included in the entire image are stored in a storage.

10. The information processing method according to claim 6, further comprising:

receiving a user's selection of the displayed area; and obtaining text information of an area selected based on the user's selection.

11. A non-transitory storage medium storing a computer program causing a computer to perform an information processing method comprising:

extracting a second feature amount of a local image;

deciding a position of the local image in an entire image based on the extracted second feature amount of the local image and a first feature amount of the entire image, wherein the first feature amount of the entire image and coordinates information of an area included in the entire image are stored in a storage;

recognizing positions of text regions from the local image;

displaying the local image and an area corresponding to the stored coordinates information stored in the storage, wherein the displayed area overlaps with the displayed local image, and wherein a position of the displayed area corresponding to the stored coordinates information is corrected based on the recognized positions of the text regions.

\* \* \* \* \*